(12) United States Patent
Dethlefsen

(10) Patent No.: US 12,310,344 B2
(45) Date of Patent: May 27, 2025

(54) FISHING BAIT DEVICE

(71) Applicant: John F. Dethlefsen, North Palm Beach, FL (US)

(72) Inventor: John F. Dethlefsen, North Palm Beach, FL (US)

( * ) Notice: Subject to any disclaimer, the term of this patent is extended or adjusted under 35 U.S.C. 154(b) by 275 days.

(21) Appl. No.: 17/820,412

(22) Filed: Aug. 17, 2022

(65) Prior Publication Data

US 2024/0057577 A1 Feb. 22, 2024

(51) Int. Cl.
 *A01K 83/06* (2006.01)
 *A01K 85/00* (2006.01)
 *A01K 91/04* (2006.01)

(52) U.S. Cl.
 CPC ........ *A01K 83/064* (2022.02); *A01K 85/1851* (2022.02); *A01K 85/1853* (2022.02); *A01K 85/1867* (2022.02); *A01K 91/04* (2013.01)

(58) Field of Classification Search
 CPC .... A01K 83/06; A01K 83/061; A01K 83/063; A01K 83/064; A01K 91/04; A01K 91/03; A01K 85/1867; A01K 85/1851; A01K 85/1853; A01K 85/1837; A01K 85/1833
 USPC ......... 43/44.2, 44.4, 44.6, 44.8, 44.9, 44.91, 43/44.87, 44.92, 44.95, 43.1, 42.36, 43/42.39, 42.49, 42.05
 See application file for complete search history.

(56) References Cited

U.S. PATENT DOCUMENTS

| | | | | |
|---|---|---|---|---|
| 524,928 A * | 8/1894 | Bacon | ..................... | A01K 83/06 43/42.49 |
| 1,324,109 A * | 12/1919 | Dutes | ..................... | A01K 83/06 43/44.6 |
| 2,385,274 A * | 9/1945 | Hammond | ............. | A01K 83/06 24/561 |
| 2,395,892 A * | 3/1946 | Lontz | ..................... | B63B 21/20 114/253 |
| 2,605,579 A * | 8/1952 | Chadwick | .............. | A01K 83/06 43/44.4 |
| 2,625,767 A * | 1/1953 | Pokras | ................... | A01K 85/00 43/42.36 |
| 2,659,996 A * | 11/1953 | Hegler, Jr. | ............. | A01K 97/00 43/44.6 |
| 2,734,302 A * | 2/1956 | Wight, Jr. | .............. | A01K 85/16 43/42.3 |
| 2,767,505 A * | 10/1956 | Noyd | ..................... | A01K 83/06 43/44.6 |
| 2,836,922 A * | 6/1958 | Cox | ........................ | A01K 83/06 43/44.2 |

(Continued)

FOREIGN PATENT DOCUMENTS

| | | | | |
|---|---|---|---|---|
| CN | 208549723 U | | 3/2019 | |
| CN | 210782612 U | * | 6/2020 | ............. A01K 91/04 |

(Continued)

*Primary Examiner* — Darren W Ark
(74) *Attorney, Agent, or Firm* — Simpson & Simpson, PLLC

(57) ABSTRACT

A device for baiting a fishhook including a fishing lure case arranged to clamp onto a fishing line, and a pair of hooks extending from and integral with the fishing lure case, the pair of hooks arranged adjacent and parallel to one another, each of the hooks having a bend and barb where the bend and barb of each hook are in spaced apart registration with one another, the pair of hooks joined by a member having a trough therein arranged to hold the fishing line.

18 Claims, 9 Drawing Sheets

(56) References Cited

U.S. PATENT DOCUMENTS

| | | | | |
|---|---|---|---|---|
| 2,940,208 A * | 6/1960 | Oswald | A01K 83/06 | |
| | | | 43/44.6 | |
| 3,019,546 A * | 2/1962 | Hansen | A01K 91/04 | |
| | | | 43/44.91 | |
| 3,040,467 A * | 6/1962 | Norton | A01K 85/00 | |
| | | | 43/44.6 | |
| 3,046,689 A * | 7/1962 | Woodley | A01K 83/06 | |
| | | | 43/44.4 | |
| 3,173,222 A * | 3/1965 | Hansen | A01K 93/00 | |
| | | | 16/225 | |
| 3,200,532 A * | 8/1965 | Walton | A01K 83/06 | |
| | | | 43/44.8 | |
| 3,497,987 A * | 3/1970 | Perrin | A01K 85/00 | |
| | | | D22/127 | |
| D217,663 S | 5/1970 | Chamberlain | | |
| 3,543,434 A * | 12/1970 | Hauck | A01K 83/06 | |
| | | | 43/44.6 | |
| 3,774,337 A * | 11/1973 | Desbois | A01K 83/06 | |
| | | | 43/44.6 | |
| 3,914,896 A * | 10/1975 | Sahagian | A01K 83/06 | |
| | | | 43/42.49 | |
| 3,945,145 A * | 3/1976 | Holden | A01K 83/06 | |
| | | | 43/44.6 | |
| 4,248,003 A * | 2/1981 | Thesz | A01K 83/06 | |
| | | | 43/44.8 | |
| 4,472,903 A * | 9/1984 | Hutson | A01K 95/00 | |
| | | | 43/44.93 | |
| 4,635,392 A * | 1/1987 | Wirkus | A01K 93/00 | |
| | | | 43/44.9 | |
| 4,644,681 A * | 2/1987 | Hutson | A01K 93/00 | |
| | | | 43/44.93 | |
| 4,796,376 A * | 1/1989 | Schlaegel | A01K 83/06 | |
| | | | 43/41 | |
| 4,869,014 A * | 9/1989 | Francklyn | A01K 83/06 | |
| | | | 43/42.49 | |
| 4,910,907 A * | 3/1990 | Schlaegel | A01K 83/06 | |
| | | | 43/44.6 | |
| 5,094,026 A * | 3/1992 | Correll | A01K 85/00 | |
| | | | D22/128 | |
| 5,189,826 A * | 3/1993 | Schlaegel | A01K 83/06 | |
| | | | 43/44.6 | |
| 5,197,220 A * | 3/1993 | Gibbs | A01K 85/16 | |
| | | | 43/44.9 | |
| 5,611,168 A * | 3/1997 | Schultz | A01K 83/06 | |
| | | | 43/44.8 | |
| 5,829,186 A * | 11/1998 | Schultz | A01K 83/06 | |
| | | | 43/44.8 | |
| 5,992,085 A * | 11/1999 | Schultz | A01K 83/06 | |
| | | | 43/44.8 | |
| 6,023,876 A | 2/2000 | Haddad et al. | | |
| 6,282,831 B1 | 9/2001 | Hugunin et al. | | |
| 6,327,808 B1 * | 12/2001 | Zascavage | A01K 85/00 | |
| | | | 43/44.9 | |
| D475,432 S | 6/2003 | Lalande | | |
| 6,698,133 B1 * | 3/2004 | Fricke | A01K 83/06 | |
| | | | 43/44.2 | |
| 6,732,470 B1 * | 5/2004 | Bennett | A01K 91/04 | |
| | | | 43/43.12 | |
| 7,140,147 B2 * | 11/2006 | Wacha | A01K 97/00 | |
| | | | 43/42.47 | |
| 7,162,830 B2 | 1/2007 | Sims | | |
| D586,876 S | 2/2009 | Kern | | |
| 7,587,855 B2 | 9/2009 | Konopa | | |
| 8,959,828 B2 * | 2/2015 | Stahl | A01K 91/03 | |
| | | | 43/44.87 | |
| 10,149,463 B2 | 12/2018 | Hudson et al. | | |
| 2005/0044772 A1 * | 3/2005 | Lillard, II | A01K 83/06 | |
| | | | 43/44.6 | |
| 2005/0235463 A1 * | 10/2005 | Dembicks | A01K 83/06 | |
| | | | 24/129 W | |
| 2006/0042147 A1 | 3/2006 | Jenkins | | |
| 2006/0156613 A1 * | 7/2006 | Sims | A01K 95/02 | |
| | | | 43/44.9 | |
| 2008/0163540 A1 * | 7/2008 | Ridolfi | A01K 95/00 | |
| | | | 43/44.9 | |
| 2009/0044441 A1 * | 2/2009 | Neal | A01K 91/04 | |
| | | | 43/43.1 | |
| 2009/0056197 A1 * | 3/2009 | Schoenike | A01K 91/10 | |
| | | | 43/44.91 | |
| 2011/0162254 A1 | 7/2011 | Smits | | |
| 2011/0203156 A1 * | 8/2011 | Christiansen | A01K 93/00 | |
| | | | 43/17 | |
| 2011/0225872 A1 * | 9/2011 | Farley | A01K 95/00 | |
| | | | 43/44.91 | |
| 2014/0259865 A1 * | 9/2014 | Kavanaugh | A01K 91/03 | |
| | | | 43/17 | |
| 2014/0290120 A1 | 10/2014 | Kinna | | |
| 2015/0013211 A1 * | 1/2015 | Schoenike | A01K 91/03 | |
| | | | 43/44.91 | |
| 2015/0013212 A1 * | 1/2015 | Majszak | A01K 95/00 | |
| | | | 43/43.1 | |
| 2018/0213759 A1 * | 8/2018 | Bustamante | A01K 93/00 | |
| 2019/0269113 A1 * | 9/2019 | Olson | A01K 83/06 | |
| 2023/0049724 A1 * | 2/2023 | Fox | A01K 91/04 | |
| 2023/0263145 A1 * | 8/2023 | Fox | A01K 85/024 | |
| | | | 43/42.36 | |
| 2024/0090485 A1 * | 3/2024 | Medborg | A01K 85/1837 | |

FOREIGN PATENT DOCUMENTS

| | | | | |
|---|---|---|---|---|
| CN | 211064726 U | * | 7/2020 | |
| DE | 1920495 A1 | * | 2/1971 | |
| EP | 2745684 A1 | * | 6/2014 | A01K 83/02 |
| GB | 2591451 A | * | 8/2021 | A01K 83/06 |
| KR | 200232003 Y1 | | 7/2001 | |
| KR | 20090001281 U | * | 2/2009 | |

* cited by examiner

FISHING BAIT DEVICE

FIELD OF THE INVENTION

The invention is a device for baiting a fishhook and, more specifically, a device for baiting a fishhook having an internal compartment arranged to hold a body, where the body is arranged to hold a fishing line.

BACKGROUND OF THE INVENTION

Early humans and ancient civilizations based their daily living around a source of fresh water: rivers, streams, or lakes. Fishing can be dated to around 40,000 years ago. In many cultures fish were a source of food for survival. Spearfishing with harpoons (barbed poles) was common as was the use of nets. Today, recreational and sporting fishing utilizes a fishing pole having a spindle, or reel, with fishing line wound thereon, and a hook fastened to a terminating end of the fishing line. Bait, such as worms, insects, smaller fish, frogs, squid, etc., are attached to the hook, either through puncturing, sewing, or the like, to allow the fisher to drag the bait through a body of water to attract fish.

Different devices for assisting the baiting process are well known in the art. In a previous design, a multi-sectional fish luring device was contemplated. The multi-sectional lure comprises a body which includes a head and a tail, where a fishing line is arranged to be threaded through a channel that extends through a center of the body and along the length of device. The lure also included skirts attached to a tail which functioned as an attractor to lure the fish to at least one hook. However, this previous multi-sectional fishing lure device did not include a hook disposed thereon or extending therefrom.

In another previous configuration of a baiting device, a fishing line attachment device included a body having a longitudinal bore arranged though the entirety of the body. The body also included a slot, where the slot is arranged to accept a bushing therein. The bushing includes a through-bore/slot, which is arranged to accept a fishing line therein, such that a hook, or hooks, could be affixed to the fishing line's terminal end. The fishing line attachment device did not include an integrally connected hook.

Baiting squid is particularly difficult. Traditional techniques require the fisher to "sew" the hook through the squid body, or mantle, multiple times—a time consuming and messy activity.

For saltwater fishing, it is known that exposed hooks on fishing lines can be seen, and therefore avoided by fish.

Therefore, there is a long-felt need for a device for baiting a fishhook having a body arranged to accept a bore, or attachment body, therein, where the body also includes at least one hook extending therefrom, and where the body and the bore, or attachment body, have an aperture/through-bore arranged to accept a fishing line.

There is another long-felt need for a device that greatly increases the speed in which a fisher can bait a hook with squid, specifically a device that avoids having to "sew" the hook through the squid multiple times.

There is also a long felt need for a device that includes at least one integrally configured hook and can accept a fishing line having another hook thereon, allowing the attached bait to conceal the hook attached to the fishing line.

SUMMARY OF THE INVENTION

The present invention generally comprises a device for baiting a fishhook including a fishing lure case arranged to clamp onto a fishing line, and a pair of hooks extending from and integral with the fishing lure case, the pair of hooks arranged adjacent and parallel to one another, each of the hooks having a bend and barb where the bend and barb of each hook are in spaced apart registration with one another, the pair of hooks joined by a member having a trough therein arranged to hold the fishing line.

The present invention generally comprises a device for baiting a fishhook, the device including a fishing lure case further including two grooved shells connected by a hinge, the first grooved shell having a securement tab, the second grooved shell having a locking tab within a tab aperture, the tab aperture arranged to accept the securement tab to form a cavity within the case, the cavity having at least one attachment protrusion, and an attachment body including a longitudinal through-bore arranged along a longitudinal central axis along the attachment body, the attachment body having at least one channel circumscribing an outer surface, the through-bore having a slit arranged on and open to the outer surface of the attachment body, wherein the attachment body is arranged to accept and hold a fishing line with the through-bore, the attachment body arranged to be seated within the cavity, wherein the at least one attachment protrusion is further arranged to be seated within the at least one channel, and wherein cylindrical housing case snaps around the attachment body.

The present invention may also generally comprise a device for baiting a fishhook having a body comprising two hingedly connected shells, including: an upper end having an aperture disposed therein; a lower end having an aperture disposed therein; at least one hook member extending from the lower end; and, an internal cavity having at least one attachment protrusion, and an attachment body including: a through-bore disposed therein; at least one attachment groove circumscribing an outer surface; and, a slit disposed along and open to the through-bore, wherein the attachment body is arranged to be removably seated within the internal cavity.

A general object of the present invention is to provide for a device that greatly increases the speed in which a fisher can bait squid to a hook, specifically a device that avoids having to "sew" the hook through the squid-type bait, or other bait, multiple times.

Another object of the present invention is to provide a device for baiting a fishhook, where the device has a body arranged to accept a bore, or attachment body therein, where the body also includes at least one hook extending therefrom, and where the body and the bore, or attachment body, have an aperture/through-bore arranged therein and further configured to accept a fishing line within the through-bore.

A further object of the present invention to provide a device for baiting a fishhook that is arranged to accept a bore, or attachment body therein, where the device has a locking mechanism to secure the bore, or attachment body, within the device and where the device has a plurality of internal structural members that are arranged to restrict axial, radial, and depth movement of the bore, or attachment body, secured within the device.

An even further object of the present invention to provide a device that can attach bait to a fishing line via at least one integrally connected hook and conceal a hook attached to the fishing line by the attached bait.

These and other objects and advantages of the present invention will be readily appreciable from the following description of preferred embodiments of the invention and from the accompanying drawings and claims.

BRIEF DESCRIPTION OF THE APPENDING FIGURES

The nature and mode of operation of the present invention will now be more fully described in the following detailed description of the invention taken with the accompanying drawing figures, in which.

Figure 7B:
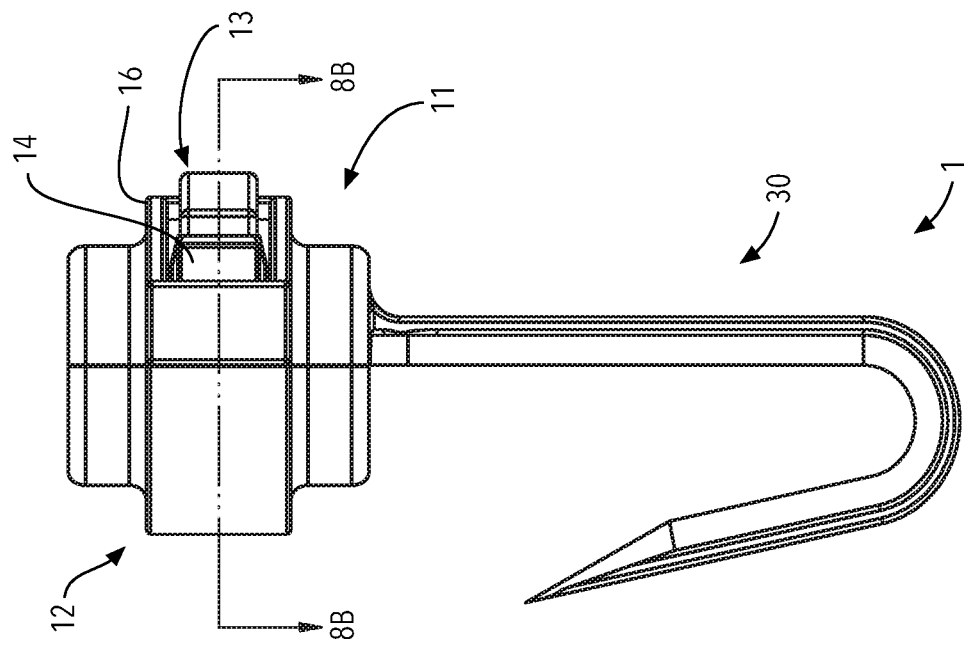
FIG. 7A illustrates a right-side view of fishing lure body 1 in an open configuration.
Figure 7A:
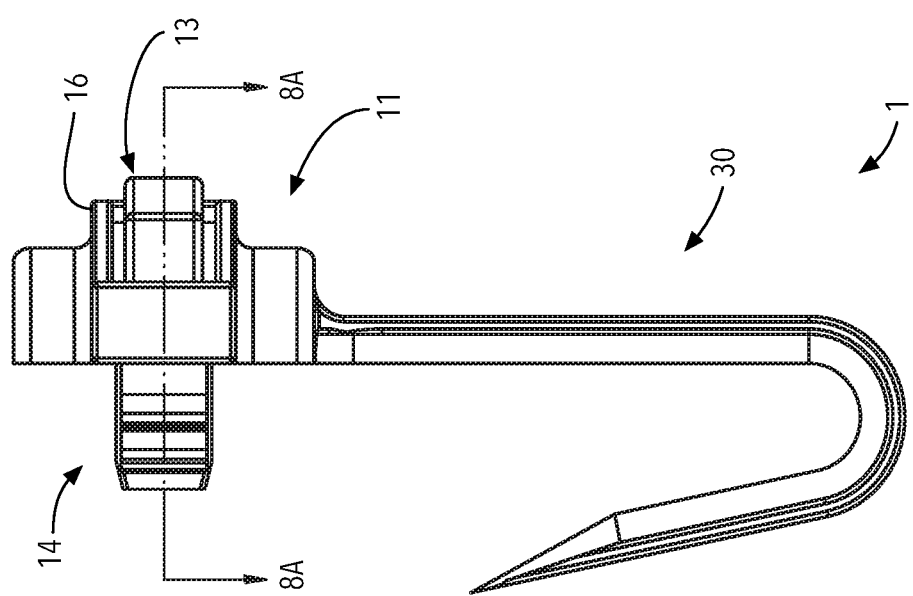
Figures 8A, 8B:
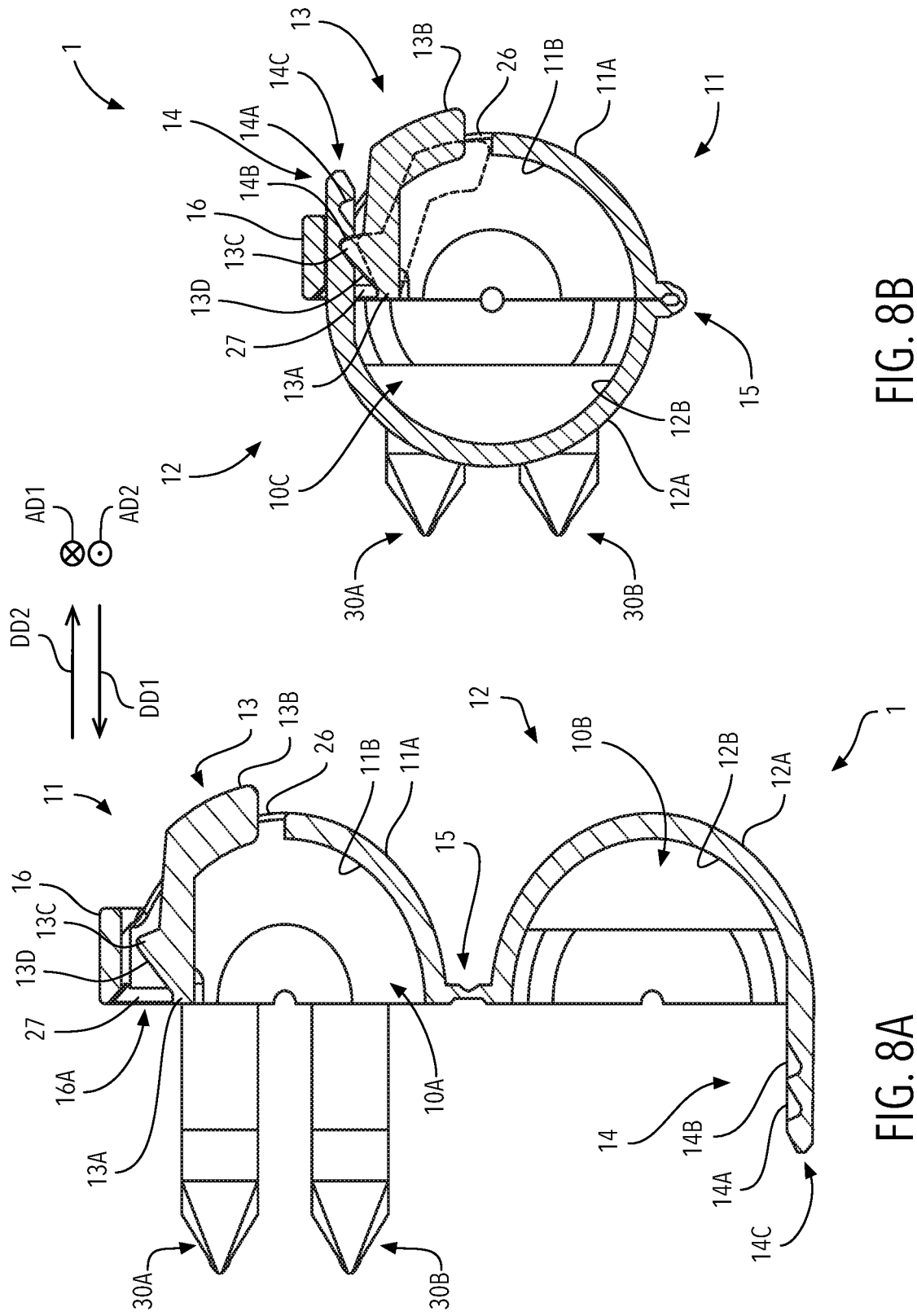
Figure 9A:
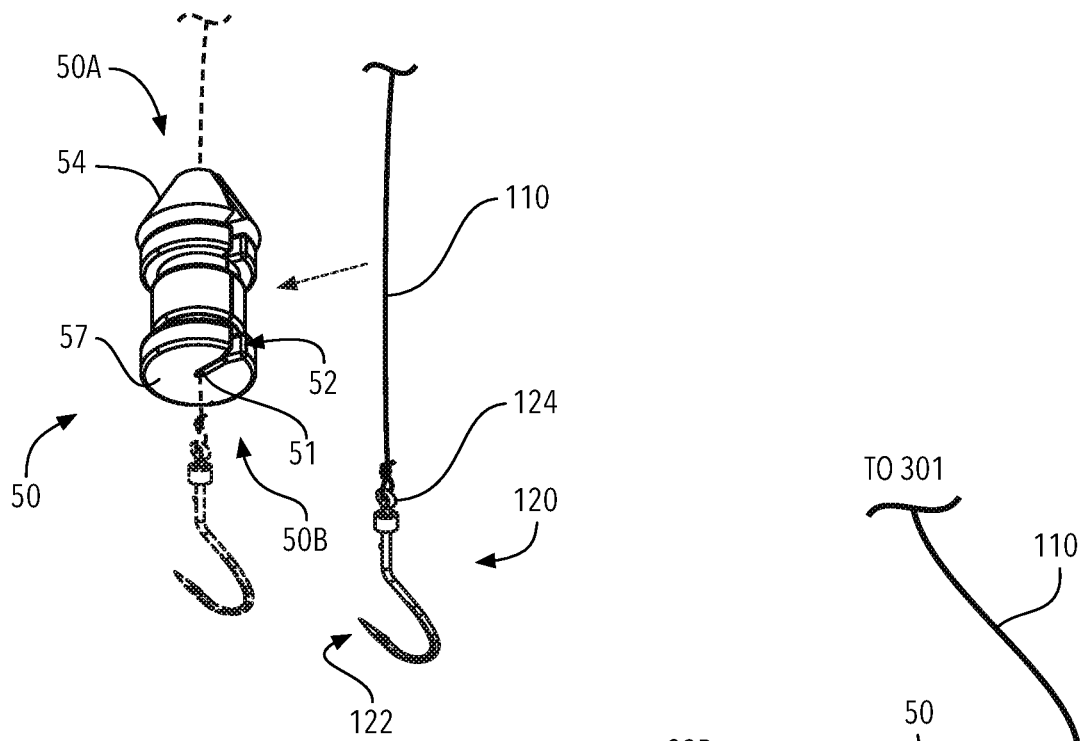
Figure 9B:
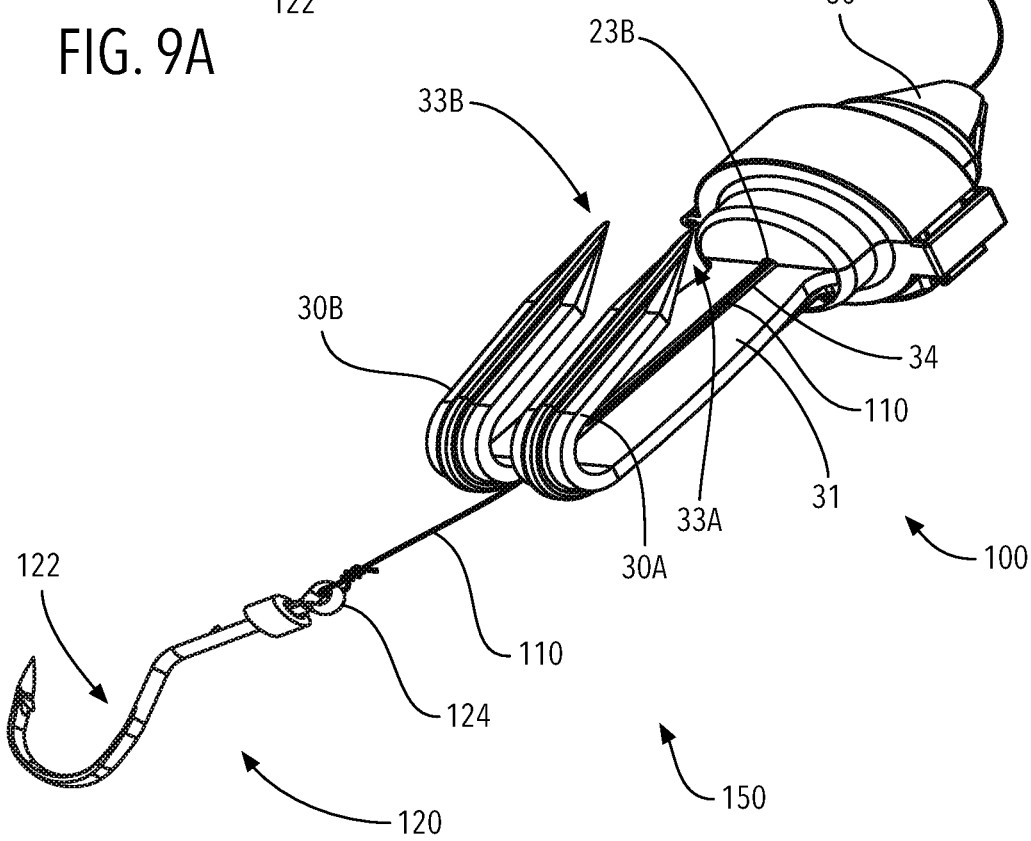

FIG. 7B generally illustrates a right-side view of fishing lure body 1 in a closed configuration;

FIG. 8A illustrates a cross-sectional view of the invention taken generally along line 8A-8A in FIG. 7A;

FIG. 8B illustrates a cross-sectional view of the invention taken generally along line 8B-8B in FIG. 7B;

FIG. 9A illustrates a perspective view of a fishing line being inserted into attachment body 50; and, FIG. 9B illustrates a perspective view of fishing lure device 100 with fishing line 110 and hook 120.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

It should also be appreciated that directional terms, such as "left", "right", "top", "bottom", and the like, are intended to be construed in view of the corresponding illustrations and should not be considered restrictive upon the scope of the present invention, nor the appending claims, as such illustrations are exemplary.

Figure 1:
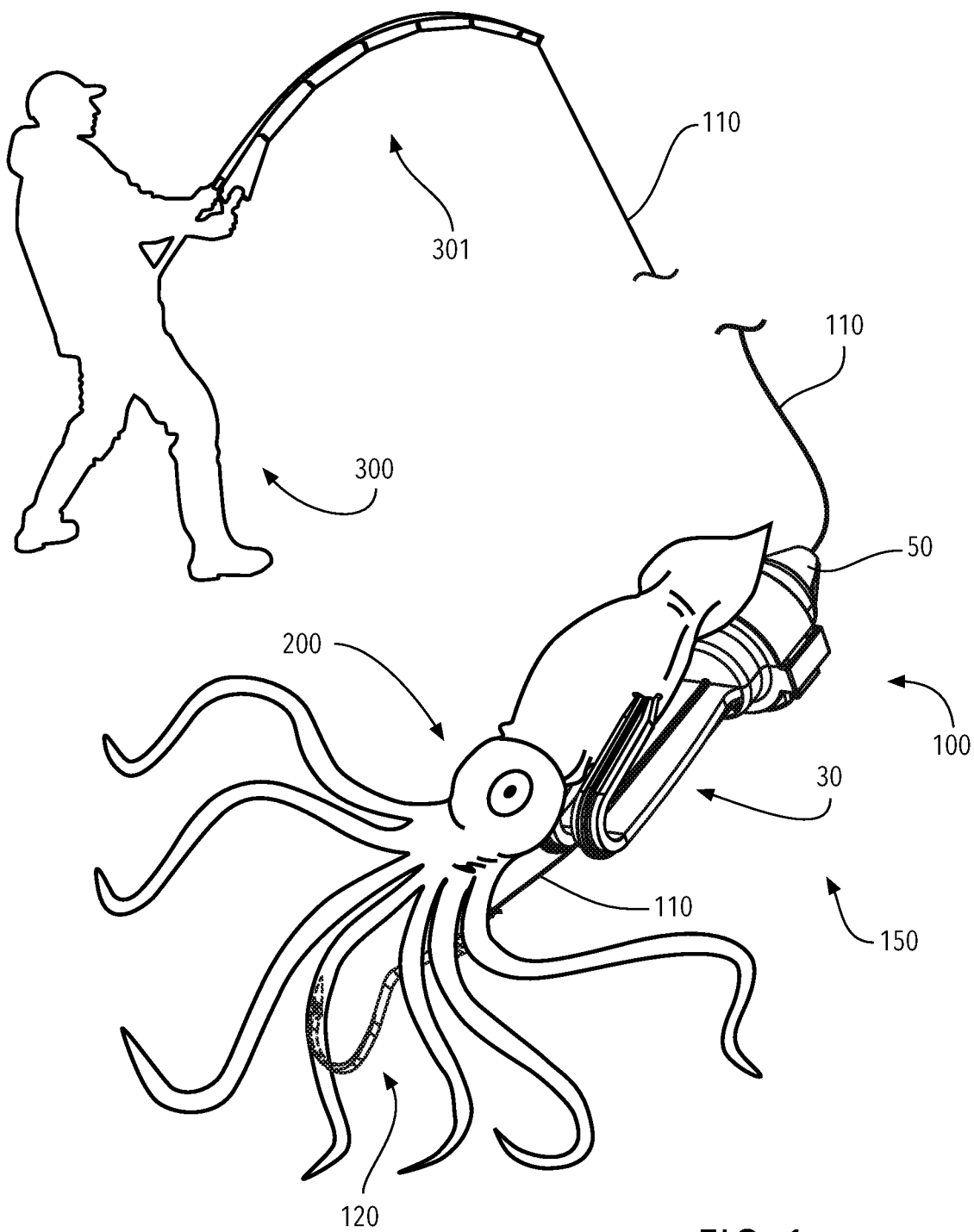
FIG. 1 illustrates a perspective view of the present invention in use.

Adverting now to the Figures. It should be appreciated that FIG. 1 is exemplary and is not shown to scale. FIG. 1 generally illustrates fisher 300 with rod 301 having fishing line 110 attached thereto. Fishing line 110 is attached to rod 301 at one end and hook 120 at the opposite end. Fishing lure assembly 150 is attached to fishing line 110 proximate to hook 120. Fishing lure assembly includes fishing lure device 100, fishing line 110, and hook 120. Fishing lure device 100 includes attachment body 50, which is arranged to hold fishing line 110 and further arranged to be removably secured within an internal cavity (shown in FIG. 2B). Fishing lure device 100 also includes hooks 30, which are shown securing bait 200 to fishing lure device 100. The arrangement of hooks 30 on fishing lure device 100 allow secured bait 200 to conceal hook 120 from fish.

Figure 2B:
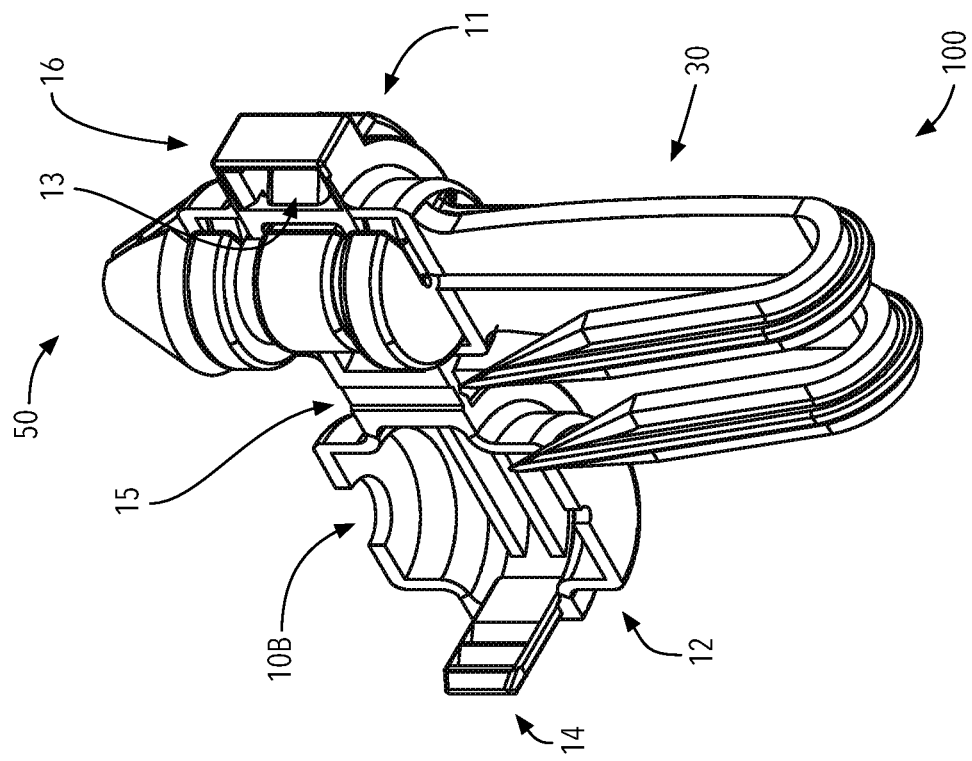
FIG. 2B illustrates a perspective view of the invention shown in FIG. 2A, specifically in an open configuration.
Figure 2A:
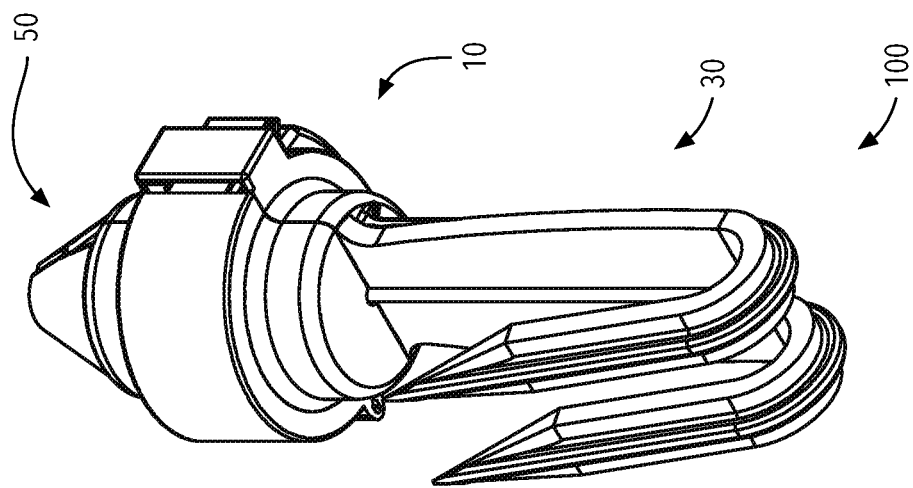
FIG. 2A illustrates a perspective view of the present invention, specifically in a closed configuration.

FIG. 2A generally illustrates a perspective view of fishing lure device 100. Fishing lure device 100 generally comprises two components, fishing lure body 1 and attachment body 50. In a preferred embodiment, hooks 30 extend from case 10 of fishing lure body 1. FIG. 2A specifically shows fishing lure device 100 in a closed configuration with attachment body 50 secured within case 10 of fishing lure body 1.

FIG. 2B generally illustrates a perspective view of fishing lure device 100 in an open configuration with attachment body 50 within. Fishing lure body 1 includes two shells, first shell 11 and second shell 12. First shell 11 and second shell 12 are connected via hinge 15. Hinge is a living hinge, that is, hinge 15 is integral with first shell 11 and second shell 12 but is deformable in configuration, allowing it to bend such that first shell 11 and second shell 12 may close, as shown in FIG. 2A. Locking tab 13 extends from an outside surface of first shell 11. Securement tab 14 extends from an outside surface of second shell 12. Locking tab 13 and securement tab 14 are discussed further in view of FIGS. 7A and 7B, infra. Hinge 15 allows first shell 11 and second shell 12 to clamp attachment body 50 therein.

Figure 3:
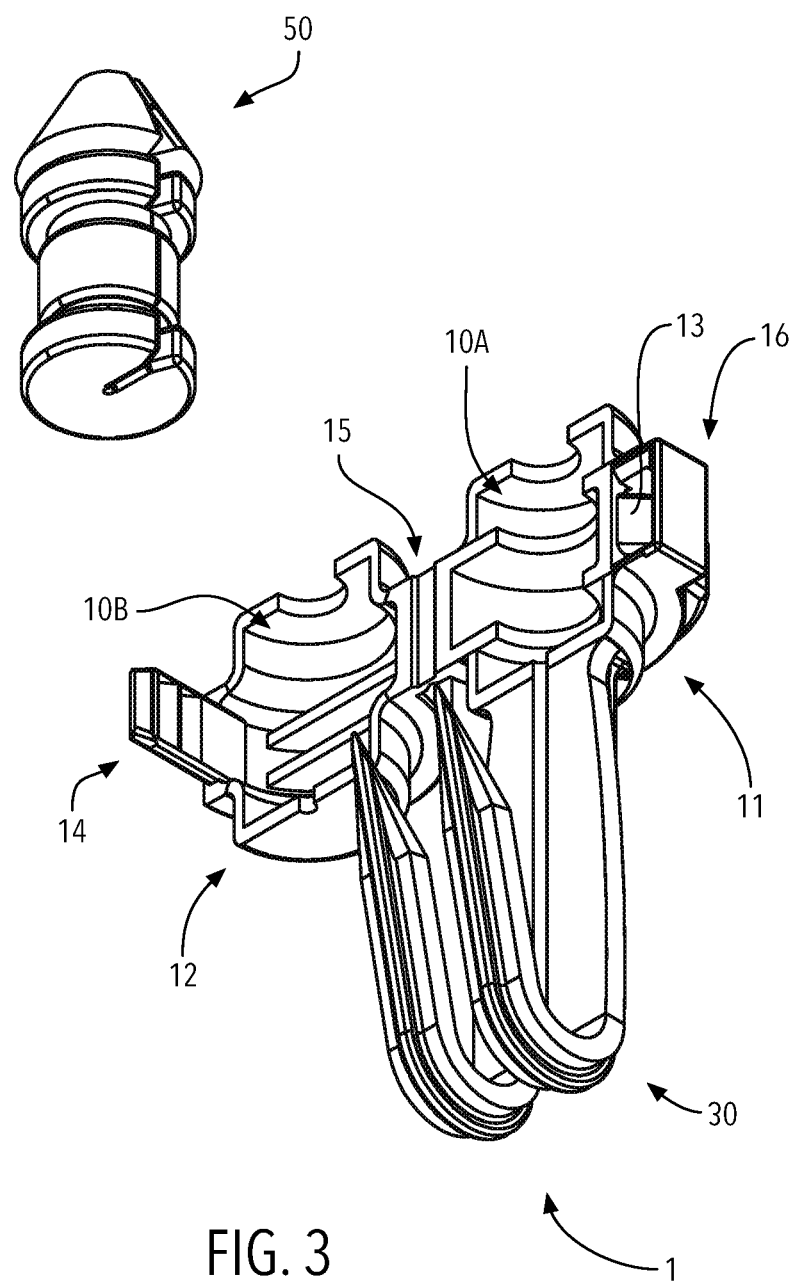
FIG. 3 illustrates an exploded perspective view of the invention shown in FIG. 2B.

FIG. 3 generally illustrates an exploded view of fishing lure device 100. Attachment body 50 is removable from fishing lure body 1, specifically from the internal cavity of fishing lure body 1. The internal cavity of fishing lure body 1 is comprised of internal cavity section 10A of first shell 11 and internal cavity section 10B of second shell 12, both sections 10A and 10B collectively form internal cavity 10C (shown in FIG. 8B).

Figure 4:
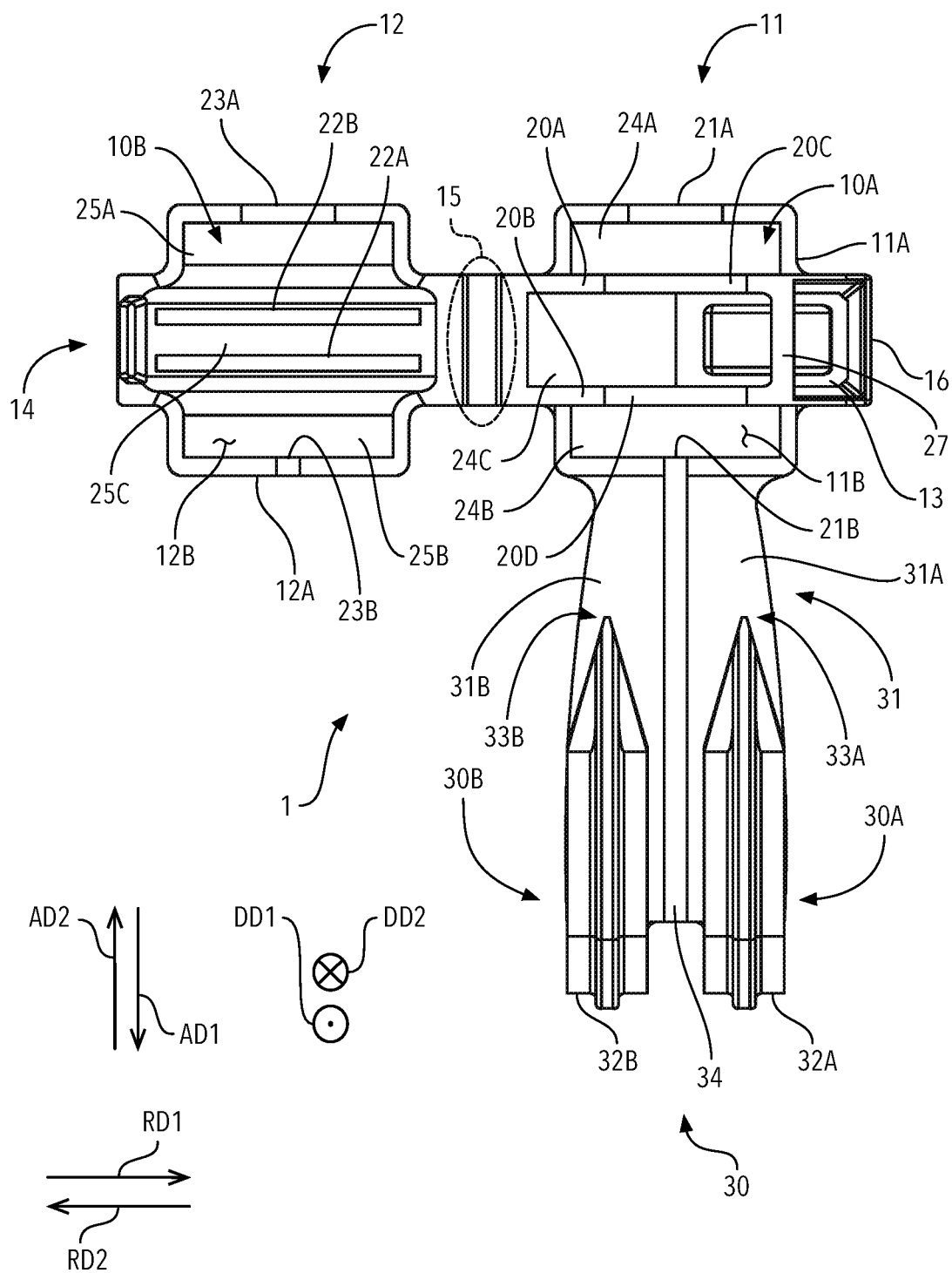
FIG. 4 illustrates a front view of fishing lure body 1.

FIG. 4 generally illustrates a front view of fishing lure body 1 in an open configuration without attachment body 50 therein. First shell 11 includes upper aperture 21A and lower aperture 21B. Both apertures 21A and 21B are open to internal cavity section 10A. In a preferred embodiment lower aperture 21B has an internal perimeter than is ater-less than the internal perimeter of upper aperture 21A. Attachment protrusions 20A and 20B extend from internal surface 11B of first shell 11. Attachment protrusions 20A and 20B include arcuate sections 20C and 20D, respectively. In a preferred embodiment, upper aperture 21A, lower aperture 21B, arcuate section 20C and arcuate section 20D all have center points that are colinearly arranged. Attachment protrusions 20A and 20B bifurcate internal cavity section 10A into upper section 24A, lower section 24B, and medial section 24C. Anchor member 27 is a section of first shell 11 which connects locking tab 13 to first shell 11.

Second shell 12 includes upper aperture 23A and lower aperture 23B. Both apertures 23A and 23B are open to internal cavity section 10B. In a preferred embodiment lower aperture 23B has an internal perimeter than is s than the internal perimeter of upper aperture 23A. Attachment protrusions 22A and 22B extend from internal surface 12B of second shell 12. Attachment protrusions 22A and 22B bifurcate internal cavity section 10B into upper section 25A, lower section 25B, and medial section 25C.

Hooks 30 extend from outer surface 11A of first shell 11, specifically body 31 of hooks 30 extends from outer surface 11A of first shell 11. Hooks 30 are defined by hook 30A and hook 30B. Trough 34 is arranged within body 31 of hooks 30. Trough 34 in a preferred embodiment has a horizontal cylindrical half-segment configuration. Trough 34 in a preferred embodiment has a center point about its arc that is colinearly arranged with the center point of lower aperture 21B. Trough 34 bifurcates body 31 into body 31A of hook 30A and body 31B of hook 30B. Bends 32A and 32B are contoured lowerly in relation to first shell 11, past the terminating end of trough 34. Bends 32A and 32B terminate into barbs 33A and 33B of first hook 30A and second hook 30B, respectively.

Figure 5A:
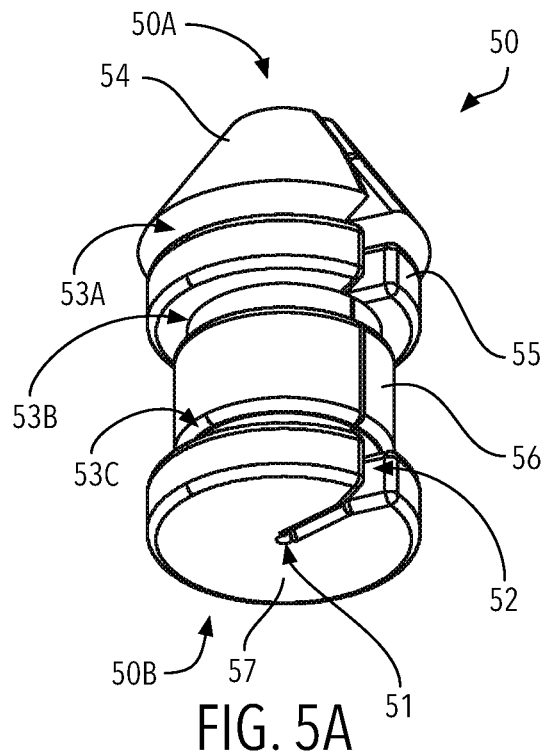
FIG. 5A illustrates a perspective view of attachment body 50.
Figure 5B:
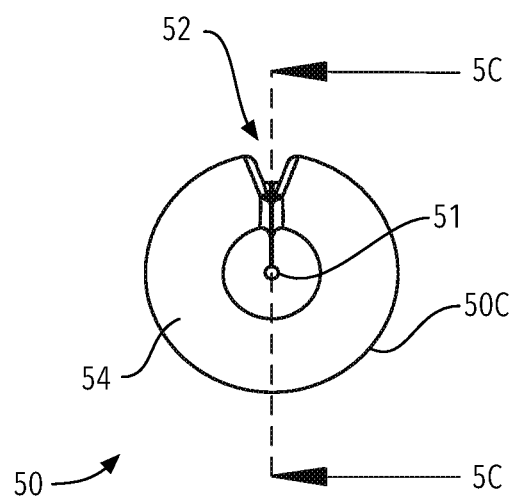
FIG. 5B illustrates a top plan view of attachment body 50.
Figure 5C:
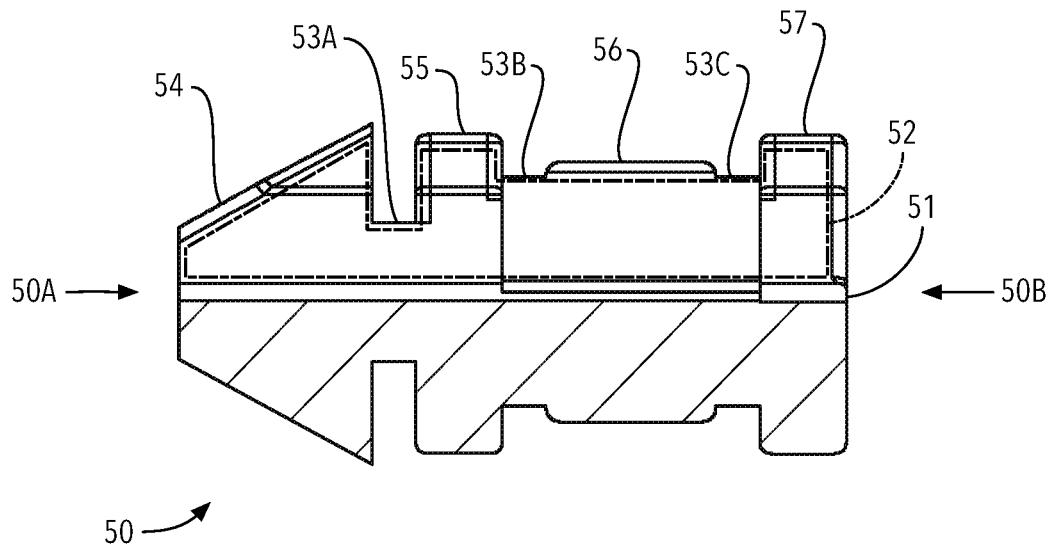
FIG. 5C illustrates a cross-sectional view of attachment body 50 taken generally along line 5C-5C in FIG. 5B.

The following description should be taken in view of FIGS. 5A through 5C. FIG. 5A generally illustrates a perspective view of attachment body 50, FIG. 5B generally illustrates a top plan view of attachment body 50, and FIG. 5C generally illustrates a cross-sectional view of attachment body 50 taken generally along line 5C-5C shown in FIG. 5B. Attachment body 50 generally comprises upper end 50A and lower end 50B, through-bore 51, and slit 52 which is open to through-bore 51. Slit 52 is arranged to accept a fishing line to arrange the fishing line within through-bore 51 of attachment body 50. The terms "slit", and "slot" are substantially synonymous.

Attachment body 50 includes upper section 54 which preferably has a frustoconical configuration, upper-medial section 55, medial section 56, and lower section 57. Upper attachment groove 53A bifurcates upper section 54 and upper-medial section 55. Upper-medial groove 53B bifurcates upper-medial section 55 and medial section 56. Upper groove 53C bifurcates medial section 56 and lower section 57. Grooves 53A-53C are all channels circumscribing the outer surface of attachment body 50. Upper-medial groove 53B and lower groove 53C preferably have the same outer circumference, whereas upper groove 53A has an outer circumference that is preferably less than the outer circumference of upper-medial groove 53B and lower groove 53C.

Figure 6:
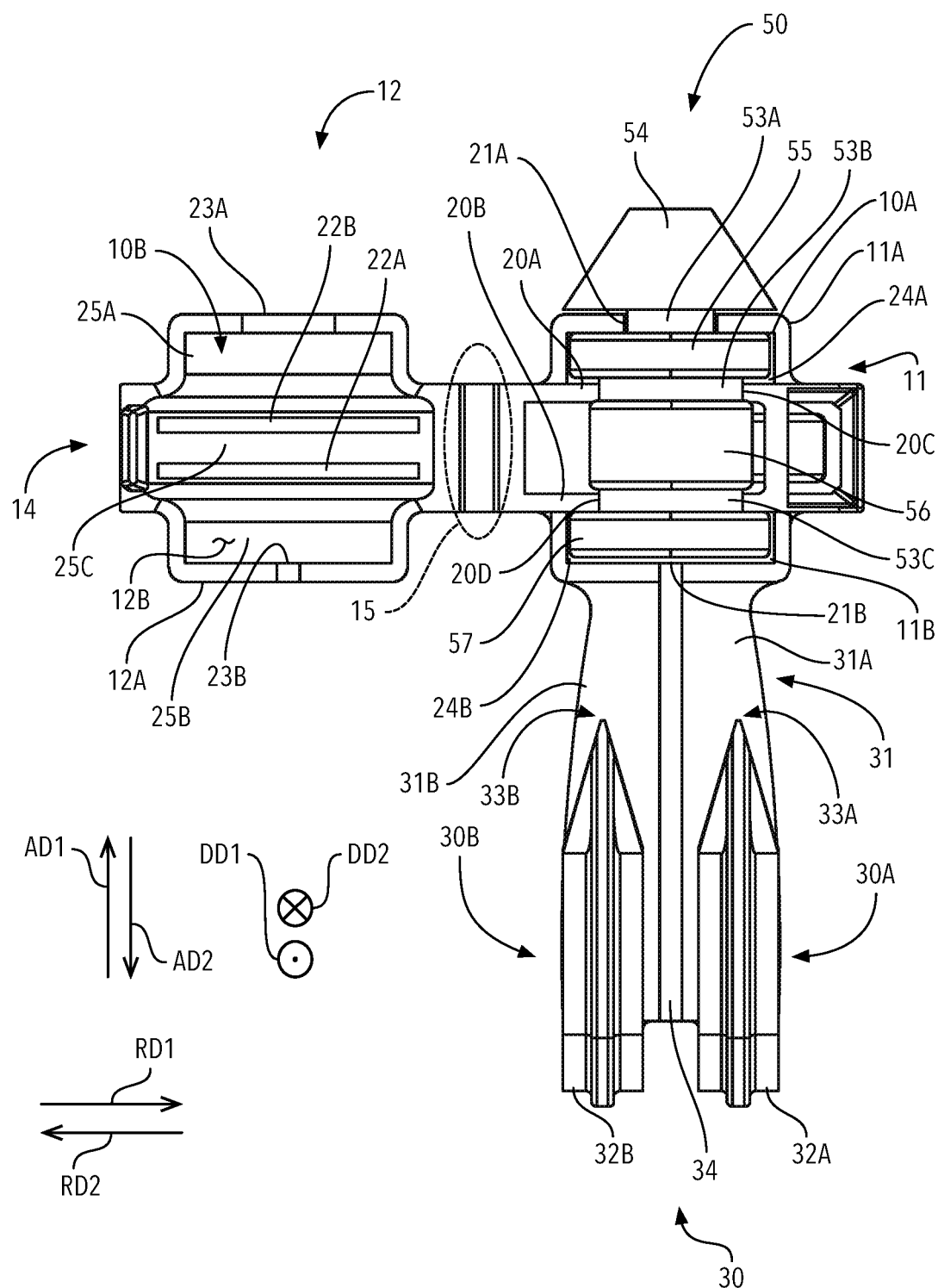
FIG. 6 illustrates a front view of the present invention shown in FIG. 2B.

FIG. 6 generally illustrates a front view of attachment body 50 within fishing lure body 1, where fishing lure body 1 is an open configuration. Attachment body 50 is arranged to be seated within first shell 11 and secured by second shell 12. Lower groove 53C of attachment body 50 is arranged to be seated within arcuate section 20D of attachment protrusion 20B. Upper-medial groove 53B of attachment body 50 is arranged to be seated within arcuate section 20C of attachment protrusion 20A. Upper groove 53A is arranged to be seated within upper aperture 21A of first shell 11. Upper groove 53A is also arranged to be seated within upper aperture 23A of second shell 12 when fishing lure body 1 is in a closed configuration. Lower section 57 of attachment body 50 rests within lower section 24B of internal cavity section 10A. Medial section 56 of attachment body 50 rests within medial section 24C of internal cavity section 10A. Upper-medial section 55 of attachment body 50 rests within upper section 24A of internal cavity section 10A. Upper section 54 of attachment body 50 rests outside of internal cavity section 10A. Arcuate sections 20C and 20D of internal cavity section 10A when engaged to upper-medial groove 53B and lower groove 53C of attachment body 50, limit the movement of attachment body 50 within first shell 11 in both axial directions AD1 and AD2 and radial directions RD1 and RD2.

When fishing lure body 1 is in a closed configuration, that is, attachment body 50 is within internal cavity section 10A of first shell 11 and within internal cavity section 10B of second shell 12, attachment protrusions 22A and 22B of internal cavity section 10B of second shell 12 will abut the outside surface of medial section 56 of attachment body 50. Attachment protrusions 22A and 22B, when abutting medial section 56 of attachment body 50, limit the movement of attachment body 50 within first shell 11 and second shell 12 in both depth directions DD1 and DD2.

The following description should be taken in view of FIGS. 7A through 8B. FIG. 7A generally illustrates a right-side view of fishing lure body 1 in an open configuration. FIG. 7B generally illustrates a right-side view of fishing lure body 1 in a closed configuration. FIG. 8A generally illustrates a cross-sectional view of fishing lure body 1 taken generally along line 8A-8A shown in FIG. 7A. FIG. 8B generally illustrates a cross-sectional view of fishing lure body 1 taken generally along line 8B-8B shown in FIG. 7B.

When fishing lure body is in a closed configuration, as shown in FIGS. 7B and 8B, internal cavity section 10A of first shell 11 and internal cavity section 10B of second shell 12 form internal cavity 10C.

First shell 11 and second shell 12 of fishing lure body 1 are connected via hinge 15. Hinge 15 in a preferred embodiment is a living hinge, that is, a flexible member made from the same material as the two rigid pieces (first shell 11 and second shell 12) it connects. Hinge 15 allows fishing lure body 1 to assume an open, or resting configuration (FIGS. 7A and 8A), or a closed configuration (FIGS. 7B and 8B). It should be appreciated that hinge 15, by default, will keep fishing lure body 1 in an open configuration, until force is imparted to close first shell 11 and second shell 12—where locking tab 13 and securement tab 14 collectively secure fishing lure body 1 in a closed configuration.

Locking tab 13 is connected to first shell 11 via anchor member 27 which is connected to the body of first shell 11. Flex portion 13A of locking tab 13 is a living hinge, deformable in construction, or the like—allowing movement of locking tab 13 when force is imparted thereon. Flex portion 13A is also the portion of locking tab 13 that is connected to first shell 11, specifically connected to anchor member 27 of first shell 11. Extending from flex portion 13A is locking protrusion 13C and release portion 13B. First shell 11 also includes slot 26. Slot 26 provides a location for release portion 13B to rest therein, where release portion 13B extends beyond outer surface 11A of first shell 11 to provide for user access.

Securement tab 14 extends from, and is integral to, second shell 12, that is, securement tab 14 shares outer surface 12A and internal surface 12B of second shell 12. Securement tab 14 includes locking grooves 14A and 14B, arranged on internal surface 12B of securement tab 14 of second shell, and tapered tip 14C arranged on the terminating end of securement tab 14.

To secure fishing lure body 1 in a closed configuration, that is, to overcome the default configuration of hinge 15 (FIGS. 7A and 8A), first shell 11 and second shell 12 must be secured together via a locking mechanism—locking tab 13 and securement tab 14. Securement tab 14 of second shell 12 is arranged such that securement tab 14 passes into aperture 16A of housing 16. Tapered tip 14C contacts tapered portion 13D of locking tab 13, thereby flexing locking tab 13 in a direction towards hinge 15. As force is continually imparted on second shell 12, tapered tip 14C moves in depth direction DD2 until locking protrusion 13C will be seated within locking groove 14A—a partially closed configuration of fishing lure body 1. As further force is continually imparted on second shell 12 in depth direction DD2, locking protrusion 13C will slide out from locking groove 14A until locking protrusion 13C will be seated within locking groove 14B—the closed configuration of fishing lure body 1. The aforementioned movements are provided by the tapered configurations of locking protrusion 13C; and, locking grooves 14A and 14B, as the tapered configuration allows these components to slide along their respective surfaces.

To release fishing lure body 1 from the closed configuration, force is applied to release portion 13B of locking tab 13, thereby flexing flex portion 13A to remove locking protrusion 13C from either locking groove 14A or 14B (illustrated in broken lines in FIG. 8B). When the locking mechanism is released, as described above, hinge 15 will unflex and return fishing lure body 1 to its default position, that is, the open configuration (FIGS. 7A and 8A).

The following description should be taken in view of FIGS. 9A and 9B. FIG. 9A generally illustrates a perspective view of attachment body 50, fishing line 110, and hook 120 attached to fishing line 110, further illustrating fishing line 110 secured within attachment body 50 in broken lines. FIG. 9B generally illustrates a perspective view of fishing lure device 100 having fishing 110 with hook 120 attached thereto.

Hook 120 includes line fastener 124 and barb 122, disposed at opposite ends thereof. Fishing line 110 is tied to fastener 124, securing hook 120 thereto. To attach fishing line 110 with hook 120 to attachment body 50, fishing line 110 is slid into slit 52 of attachment body 50 until fishing line 110 is resting within through-bore 51 of attachment body 50, preferably in a central location within through-bore 51. In a preferred embodiment, the end of fishing line 110 with hook 120 is disposed at upper end 50A of attachment body, specifically the end of fishing line 110 with hook 120 exits through-bore 50 from upper section 54 of attachment body 50, where the remainder of fishing line 110 which is attached to a rod and reel, is disposed at lower end 50B of attachment body, specifically exiting through-bore 50 from lower section 57 of attachment body 50.

Once fishing line 110 with hook 120 is secured within attachment body 50, attachment body 50 is seated within fishing lure body 1, where now fishing lure device 100 (the combination of fishing lure body 1 and attachment body 50) and fishing line 110 with hook 120—fishing lure assembly 150, is ready to secure bait thereon, as shown in FIG. 1.

The following description should be taken in view of all of the aforementioned Figures. In alternative embodiments of fishing lure device 100, hooks 30 may not be present, such that fishing lure device 100 would function solely as a clamping mechanism device to secure attachment body 50 therein, as described, supra. Alternative, only one of hooks 30 may be present, where trough 34 would be alternative arranged on the back surface of the singular hook, that is, the surface opposite of barbs 33A and 33B of hooks 30.

The aforementioned components of fishing lure body 1 may all be comprised of the same material composition, preferably a plastic, polymer, or the like, so long as hinge 15 may still function as a living hinge. In alternative embodiments, hinge 15 could be a separate component that is affixed to first shell 11 and second shell 12. In further alternative embodiments, hooks 30A and 30B along with body 31 could be composed of a metal, or different material than first shell 11 and second shell 12. In even further alternative embodiments, barbs 33A and 33B of hooks 30 could be comprised of a metal, or a different material than first shell 11, second shell 12, and body 31.

It should also be appreciated that attachment body 50 in alternative embodiments may not include upper section 54, or upper section 54 may have alternative configurations instead of a frustoconical shape, e.g., domed, planar, etc.

It should also be appreciated that the locking mechanism of fishing lure body 1 may be inversely arranged on the respective first and second shell of fishing lure body 1.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMERALS

1 Fishing lure body
10 Case
10A Internal cavity section
10B Internal cavity section
10C Internal cavity
11 First shell of case 10
11A Outer surface of first shell 11
11B Internal surface of first shell 11
12 Second shell of case 10
12A Outer surface of second shell 12
12B Internal surface of second shell 12
13 Locking tab first shell 11
13A Flex portion of locking tab 13
13B Release portion of locking tab 13
13C Locking protrusion of locking tab 13
13D Tapered portion of locking tab 13
14 Securement tab of second shell 12
14A Securement groove of securement tab 14
14B Securement groove of securement tab 14
14C Tapered tip of securement tab 14
15 Hinge
16 Housing of locking tab 13
16A Aperture of housing 16
20A First attachment protrusion of first shell 11
20B Second attachment protrusion of first shell 11
20C Arcuate section of attachment protrusion 20A
20D Arcuate section of attachment protrusion 20B
21A Upper aperture of first shell 11
21B Lower aperture of first shell 11
22A First attachment protrusion of second shell 12
22B Second attachment protrusion of second shell 12
23A Upper aperture of second shell 12
23B Lower aperture of second shell 12
24A Upper section of internal cavity section 10A
24B Lower section of internal cavity section 10A
24C Medial section of internal cavity section 10A
25A Upper section of internal cavity section 10B
25B Lower section of internal cavity section 10B
26 Slot of first shell 11
27 Anchor member of locking tab 13
30 Hooks
30A First hook 30B Second hook
31 Body of hooks 30
31A Body of hook 30A
31B Body of hook 30B
32A Bend of hook 30A
32B Bend of hook 30B
33A Barb of hook 30A
33B Bard of hook 30B
34 Trough of body 31
50 Attachment body
50A Upper end of attachment body 50
50B Lower end of attachment body 50
51 Through-bore of attachment body 50
52 Slit of through-bore 51
53A Upper groove
53B Upper-medial groove
53C Lower groove
54 Upper section of body 50
55 Upper-medial section of body 50
56 Medial section of body 50
57 Lower section of body 50
100 Fishing lure device
110 Fishing line
120 Hook
122 Barb of hook 120
124 Line fastener of hook 120
150 Fishing lure assembly
200 Bait
300 Fisher
301 Fishing rod
AD1 Axial direction
AD2 Axial direction
DD1 Depth direction
DD2 Depth direction
RD1 Radial direction
RD2 Radial direction

What I claim is:

1. A device for baiting a fishhook, comprising:
a fishing lure case arranged to clamp onto a fishing line;
a pair of hooks extending from and integral with said fishing lure case, said pair of hooks arranged adjacent and parallel to one another, each of said hooks having a bend and barb where the bend and barb of each said hook are in spaced apart registration with one another, said pair of hooks joined by a member having a trough therein arranged to hold said fishing line, and,
an attachment body arranged to be clamped within said fishing lure case, said attachment body including a through-bore having a slit open to an external surface of said attachment body, wherein said attachment body is arranged to accept said fishing line within said through-bore.

2. The device for baiting a fishhook recited in claim 1, wherein said fishing lure case comprises two hingedly connected shells, said shells having a locking mechanism to securely clamp said attachment body therein.

3. The device for baiting a fishhook recited in claim 2, wherein said fishing lure case comprises a pair of oppositely arranged apertures, said apertures of said fishing lure case, said through-bore of said attachment body within said case, and said trough are colinearly arranged.

4. The device for baiting a fishhook recited in claim 2, wherein said locking mechanism further comprises:
a securement tab flexibly connected to one of said two hingedly connected shells, said securement tab having at least one securement protrusion; and,
a locking tab arranged within a locking aperture, said locking tab flexibly connected to an other of said two hingedly connected shells, said locking tab having at least one locking groove,
wherein said at least one securement protrusion is arranged to be seated within said at least one locking groove when said two hingedly connected shells securely clamp said attachment body therein.

5. The device for baiting a fishhook recited in claim 2, wherein said device further comprises said fishing line which includes a third hook at an end of said fishing line, wherein when said pair of hooks are engaged to a bait said third hook is concealed by said bait.

6. A device for baiting a fishhook secured to a fishing line, comprising:
a body comprising two hingedly connected shells, said body having:
an upper end having an aperture disposed therein;
a lower end having an aperture disposed therein;
at least one hook member extending from said lower end; and,
an internal cavity having at least one attachment protrusion; and,
an attachment body including:
a through-bore disposed therein, said through-bore arranged to hold said fishing line;
at least one attachment groove circumscribing an outer surface of said attachment body; and,
a slit disposed longitudinally along said attachment body, arranged to provide access to said through-bore for said fishing line, wherein said attachment body is arranged to be removably seated within said internal cavity.

7. The device for baiting a fishhook recited in claim 6, wherein said two hingedly connected shells further comprise a first shell and a second shell, said first shell including a securement tab extending therefrom, said second shell including a locking tab within a tab aperture extending therefrom, wherein said securement tab removably connects to said locking tab to close said first shell and said second shell.

8. The device for baiting a fishhook recited in claim 7, wherein said first shell and said second shell are connected via a living hinge.

9. The device for baiting a fishhook recited in claim 7, wherein:
said securement tab is flexibly connected to said first shell, said securement tab having at least one locking groove; and,
said locking tab is flexibly connected to said second shell, said locking tab having at least one locking protrusion, wherein said at least one locking protrusion is arranged to be seated within said at least one locking groove when said first shell and said second shell are in a closed configuration.

10. The device for baiting a fishhook recited in claim 7, wherein said at least one attachment protrusion of said internal cavity is arranged to be seated within said at least one attachment groove of said attachment body when said attachment body is within said internal cavity of said body.

11. The device for baiting a fishhook recited in claim 6, wherein said at least one hook member comprises a pair of hooks having a trough disposed therein, said trough arranged colinearly with said aperture of said upper end and said aperture of said lower end.

12. The device for baiting a fishhook recited in claim 11, wherein each hook of said pair of hooks includes a bend and barb where the bend and barb of each said hook are in spaced apart registration with one another, said pair of hooks joined by a member, said member having said trough arranged therein.

13. The device for baiting a fishhook recited in claim 12, wherein said fishing line includes a third hook at an end of said fishing line, wherein when said pair of hooks are engaged to a bait said third hook is concealed by said bait.

14. The device for baiting a fishhook recited in claim 6, wherein said aperture of said upper end, said aperture of said lower end, and said through-bore of said attachment body are arranged to accept said fishing line therein.

15. A device for baiting a fishhook comprising:
- a fishing lure case further including two grooved shells connected by a hinge, a first grooved shell of said two grooved shells having a securement tab, a second grooved shell of said two grooved shells having a locking tab within a tab aperture, said tab aperture arranged to accept said securement tab to form a cavity within said case, said cavity having at least one attachment protrusion, the case having a pair of hooks extending therefrom and the hooks having a trough aligned therebetween; and,
- an attachment body including a longitudinal through-bore arranged along a longitudinal central axis along said attachment body, said attachment body having at least one channel circumscribing an outer surface, said through-bore having a slit arranged on and open to said outer surface of said attachment body,
- wherein said attachment body is arranged to accept and hold a fishing line with said through-bore, said attachment body arranged to be seated within said cavity, wherein said at least one attachment protrusion is further arranged to be seated within said at least one channel, and wherein said fishing lure case snaps around said attachment body.

16. The device for baiting a fishhook recited in claim 15, where said fishing lure case includes an upper aperture and a lower aperture, said upper aperture and said lower aperture open to said cavity, said upper aperture, said lower aperture, and said trough of said pair of hooks are all arranged to accept and hold a fishing line therein.

17. The device for baiting a fishhook recited in claim 15, wherein each hook of said pair of hooks includes a bend and barb where the bend and barb of each said hook are in spaced apart registration with one another, said pair of hooks joined by a member, said member having said trough arranged therein.

18. The device for baiting a fishhook recited in claim 15, wherein said device further comprises said fishing line which includes a third hook at an end of said fishing line, wherein when said pair of hooks are engaged to a bait said third hook is concealed by said bait.

\* \* \* \* \*